United States Patent
Mallary

(10) Patent No.: US 9,355,654 B1
(45) Date of Patent: May 31, 2016

(54) SPIN TORQUE OSCILLATOR FOR MICROWAVE ASSISTED MAGNETIC RECORDING WITH INCREASED DAMPING

(71) Applicant: Western Digital Technologies, Inc., Irvine, CA (US)

(72) Inventor: Michael L. Mallary, Sterling, MA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/725,731

(22) Filed: Dec. 21, 2012

(51) Int. Cl.
*G11B 5/127* (2006.01)
*G11B 5/00* (2006.01)

(52) U.S. Cl.
CPC ........ *G11B 5/127* (2013.01); *G11B 2005/0024* (2013.01)

(58) Field of Classification Search
CPC ............................................... G11B 2005/0024
USPC ............... 360/125.3–125.31, 125.71, 125.74
See application file for complete search history.

(56) References Cited

U.S. PATENT DOCUMENTS

| | | | |
|---|---|---|---|
| 4,656,546 A | 4/1987 | Mallory | |
| 7,075,756 B1 | 7/2006 | Mallary et al. | |
| 7,473,478 B2 | 1/2009 | Sbiaa et al. | |
| 7,589,600 B2 | 9/2009 | Dimitrov et al. | |
| 7,616,412 B2 | 11/2009 | Zhu et al. | |
| 7,678,475 B2 | 3/2010 | Slavin et al. | |
| 7,791,829 B2 | 9/2010 | Takeo et al. | |
| 7,940,485 B2 | 5/2011 | Kudo et al. | |
| 7,957,098 B2 | 6/2011 | Yamada et al. | |
| 7,965,464 B2 | 6/2011 | Batra et al. | |
| 7,965,474 B2 | 6/2011 | Sato et al. | |
| 7,982,996 B2 | 7/2011 | Smith et al. | |
| 8,027,118 B2 | 9/2011 | Ezawa et al. | |
| 8,064,244 B2 | 11/2011 | Zhang et al. | |
| 8,085,490 B2 | 12/2011 | Franca-Neto et al. | |
| 8,139,322 B2 | 3/2012 | Yamada et al. | |
| 8,154,825 B2 | 4/2012 | Takashita et al. | |
| 8,159,769 B2 | 4/2012 | Batra et al. | |
| 8,164,854 B2 | 4/2012 | Takagishi et al. | |
| 8,174,798 B2 | 5/2012 | Nagasawa et al. | |
| 8,194,361 B2 | 6/2012 | Kudo et al. | |
| 8,203,389 B1 | 6/2012 | Zhou et al. | |
| 8,208,219 B2 | 6/2012 | Zhang et al. | |
| 8,289,818 B2 | 10/2012 | Taratorin et al. | |
| 8,456,967 B1 | 6/2013 | Mallary | |
| 2008/0014424 A1* | 1/2008 | Lim et al. ....................... | 428/220 |
| 2008/0019040 A1* | 1/2008 | Zhu et al. ...................... | 360/110 |
| 2008/0112087 A1 | 5/2008 | Clinton et al. | |
| 2008/0241597 A1* | 10/2008 | Dieny et al. ................. | 428/811.2 |
| 2008/0304176 A1 | 12/2008 | Takagishi et al. | |
| 2009/0052095 A1* | 2/2009 | Yamada ................... | G11B 5/02 360/324 |

(Continued)

OTHER PUBLICATIONS

Bailey, William, et al., "Control of Magnetization Dynamics in Ni81Fe19 Thin Films Through the Use of Rare-Earth Dopants", IEEE Transactions on Magnetics, vol. 37, No. 4, Jul. 2001, pp. 1749-1754.

(Continued)

*Primary Examiner* — Adam B Dravininkas

(57) ABSTRACT

A microwave assisted magnetic recording (MAMR) write head includes a write pole tip, a trailing shield, and a spin torque oscillator between the write pole tip and the trailing shield. The spin torque oscillator may have a field generating layer and a damping layer which is exchanged coupled to the field generating layer.

26 Claims, 2 Drawing Sheets

(56) References Cited

U.S. PATENT DOCUMENTS

| | | | |
|---|---|---|---|
| 2009/0059418 A1 | 3/2009 | Takeo et al. | |
| 2009/0059423 A1* | 3/2009 | Yamada et al. | 360/122 |
| 2009/0080105 A1 | 3/2009 | Takashita et al. | |
| 2009/0080106 A1 | 3/2009 | Shimizu et al. | |
| 2009/0080120 A1 | 3/2009 | Funayama et al. | |
| 2009/0201614 A1 | 8/2009 | Kudo et al. | |
| 2009/0225465 A1 | 9/2009 | Iwasaki et al. | |
| 2009/0257151 A1 | 10/2009 | Zhang et al. | |
| 2009/0310254 A1 | 12/2009 | Oikawa et al. | |
| 2009/0316303 A1 | 12/2009 | Yamada et al. | |
| 2009/0316304 A1 | 12/2009 | Funayama et al. | |
| 2010/0007992 A1 | 1/2010 | Yamada et al. | |
| 2010/0007996 A1 | 1/2010 | Iwasaki et al. | |
| 2010/0027158 A1 | 2/2010 | Takagishi et al. | |
| 2010/0027161 A1 | 2/2010 | Takagishi et al. | |
| 2010/0033881 A1 | 2/2010 | Carey et al. | |
| 2010/0053795 A1 | 3/2010 | Kudo et al. | |
| 2010/0073806 A1 | 3/2010 | Koui et al. | |
| 2010/0079919 A1 | 4/2010 | Nagasawa et al. | |
| 2010/0110592 A1 | 5/2010 | Koui et al. | |
| 2010/0134922 A1 | 6/2010 | Yamada et al. | |
| 2010/0142088 A1 | 6/2010 | Iwasaki et al. | |
| 2010/0195247 A1 | 8/2010 | Mochizuki et al. | |
| 2010/0220415 A1* | 9/2010 | Yamada et al. | 360/319 |
| 2010/0232053 A1 | 9/2010 | Yano et al. | |
| 2011/0007431 A1 | 1/2011 | Braganca et al. | |
| 2011/0018647 A1 | 1/2011 | Lee et al. | |
| 2011/0019305 A1 | 1/2011 | Suss et al. | |
| 2011/0038080 A1 | 2/2011 | Alex et al. | |
| 2011/0038081 A1 | 2/2011 | Contreras et al. | |
| 2011/0096443 A1* | 4/2011 | Zhang et al. | 360/324.2 |
| 2011/0141629 A1 | 6/2011 | Braganca et al. | |
| 2011/0149428 A1* | 6/2011 | Franca-Neto et al. | 360/75 |
| 2011/0279921 A1* | 11/2011 | Zhang et al. | 360/59 |
| 2012/0002331 A1 | 1/2012 | Oikawa et al. | |
| 2012/0038430 A1 | 2/2012 | Kim et al. | |
| 2012/0069465 A1 | 3/2012 | Sato et al. | |
| 2012/0113540 A1 | 5/2012 | Zhang et al. | |
| 2012/0120518 A1 | 5/2012 | Matsubara et al. | |
| 2012/0129518 A1 | 5/2012 | Hinrikus et al. | |
| 2012/0134922 A1 | 5/2012 | Tsien et al. | |
| 2012/0162823 A1 | 6/2012 | Ikai et al. | |
| 2012/0275060 A1* | 11/2012 | Shimizu et al. | 360/110 |
| 2013/0050875 A1* | 2/2013 | Yamada | G11B 5/1278 360/125.3 |

OTHER PUBLICATIONS

Endo, Yasushi, et al., "Correlation Between Saturation Magnetostriction and Damping Constant in (Ni—Fe)1-xMx (M=Pt, Au, Pd, and Cr) Films", IEEE Transactions on Magnetics, vol. 47, No. 10, Oct. 2011, pp. 3324-3327.

Endo, Y., et al., "Effect of Doping Elements on the Damping Constant of (Ni—Fe)1-xMx (M=Ga, Ag, Mo, and W) Films", INTERMAG 2012, pp. CQ-09.

Endo, Yasushi, et al., "Influence of Magnetostriction on Damping Constant of (Ni—Fe)1-xMx Film with Various Ni Concentrations (x)", AIP Journal of Applied Physics 109, 07D336 (2011).

Shichang, Zhou, et al., "Magnetostatic Mode Spectra of a Double Layered Film Having Different Magnetization and Anisotropy Energies", Journal of Magnetism and Magnetic Materials 65 (1987), pp. 145-150.

Xiaochun Zhu et al., "Bias-Field-Free Microwave Oscillator Driven by Perpendicularly Polarized Spin Current", IEEE Transactions on Magnetics, vol. 42, No. 10, Oct. 2006, pp. 2670-2672.

Yuhui Tang, et al., "Narrow Track Confinement by AC Field Generation Layer in Microwave Assisted Magnetic Recording", IEEE Transactions on Magnetics, vol. 44, No. 11, Nov. 2008, pp. 3376-3379.

\* cited by examiner

SPIN TORQUE OSCILLATOR FOR MICROWAVE ASSISTED MAGNETIC RECORDING WITH INCREASED DAMPING

FIELD

The present disclosure relates generally to perpendicular magnetic recording for hard disk drives, and more particularly, to perpendicular magnetic recording with a spin torque oscillator for microwave assisted magnetic recording with increased damping.

BACKGROUND

For years, the hard disk drive industry has focused on longitudinal magnetic recording to record data on disks. In longitudinal recording, the direction of the magnetic charge for each data bit is aligned horizontally to the disk that spins inside the hard drive. More recently, perpendicular magnetic recording (PMR) has become the favored technology. In PMR, the direction of magnetic charge for each data bit is aligned vertically to the spinning disk, providing the ability to substantially increase aerial density by providing more data on a disk than is possible with conventional longitudinal recording.

New technologies are being developed to further increase aerial density by reducing the size of the magnetic grains that comprise the data bits in the recording layer on the surface of the disk. This reduction in the size of magnetic grains requires a corresponding increase in the magnetic anisotropy in the recording layer to maintain thermal stability. Any increase in magnetic anisotropy, however, requires a stronger write field to switch the magnetic grains and write to the disk. Today, the ability of write heads to produce sufficient write field strength is one of the limiting factors in reducing the magnetic grain size to increase aerial density.

One possible solution is PMR with high frequency assisted writing using a spin torque oscillator (STO). This type of recording, also called microwave assisted magnetic recording (MAMR), applies a microwave field from the STO to the magnetic grains of the recording layer. The microwave field may have a frequency close to the resonance frequency of the magnetic grains to facilitate the switching of the magnetization of the grains at lower write fields from the conventional write head than would otherwise be possible without assisted recording.

The STO may be located between the write pole tip and the trailing shield of the PMR write head. The STO is a multilayer film stack that includes a polarization layer and a field generating layer. When an electrical current is applied to the STO, the polarization layer generates a spin-polarized current. The spin polarized current is used to excite magnetic oscillations in the field generating layer and thereby generate a microwave field useful for MAMR applications.

Increasing the damping in the field generating layer reduces the settling time for stabilizing the rotation of the magnetization of the field generating layer when the write pole tip field is reversed in order to place the next magnetic transition on the disk. Thus, the data rate of the write process is improved. However, this approach also has the disadvantage that it can compromise certain properties of the STO such as saturation magnetization and spin polarization. Accordingly, there is a need in the art to achieve a controlled increase of the effective damping of the field generating layer without degrading these properties.

SUMMARY

Several aspects of the present invention will be described more fully hereinafter with reference to various embodiments of apparatuses and methods related to PMR with a spin torque oscillator for MAMR.

One aspect of an MAMR write head includes a write pole tip, a trailing shield, and a spin torque oscillator between the write pole tip and the trailing shield, the spin torque oscillator having a field generating layer and a damping layer exchanged coupled to the field generating layer.

Another aspect of an MAMR write head includes a write pole tip, a trailing shield, and a spin torque oscillator between the write pole tip and the trailing shield, the spin torque oscillator having a field generating layer and a second layer exchanged coupled to the field generating layer, wherein the second layer is configured to provide magnetic damping greater than the magnetic damping in the field generating layer.

A further aspect of an MAMR write head includes a write pole tip, a trailing shield, and a spin torque oscillator between the write pole tip and the trailing shield, the spin torque oscillator having a field generating layer and a second layer exchanged coupled to the field generating layer, wherein the second layer is configured to increase damping to the field generating layer.

One aspect of a magnetic hard disk drive includes a rotatable magnetic recording disk, and a microwave assisted magnetic recording write head arranged within the hard disk drive to interface with the magnetic recording disk, wherein the MAMR write head comprises a write pole tip, a trailing shield, and a spin torque oscillator between the write pole tip and the trailing shield, the spin torque oscillator having a field generating layer and a damping layer exchanged coupled to the field generating layer.

One aspect of a spin torque oscillator for a microwave assisted magnetic recording write head includes a field generating layer, and a damping layer exchanged coupled to the field generating layer.

It will be understood that other aspects of the present invention will become readily apparent to those skilled in the art from the following disclosure, wherein it is shown and described only several embodiments of the invention by way of illustration. As will be realized by those skilled in the art, the present invention is capable of other and different embodiments and its several details are capable of modification in various other respects, all without departing from the spirit and scope of the invention. Accordingly, the drawings and detailed description are to be regarded as illustrative in nature and not as restrictive.

BRIEF DESCRIPTION OF THE DRAWINGS

Various aspects of the present invention will now be presented in the detailed description by way of example, and not by way of limitation, with reference to the accompanying drawings, wherein.

DETAILED DESCRIPTION

Figure 1:
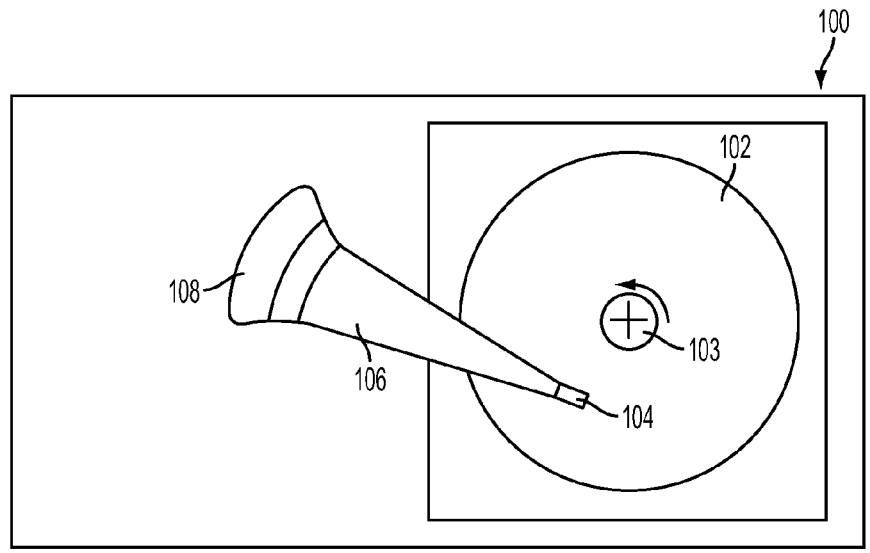
FIG. 1 is a conceptual view of an exemplary embodiment of a PMR hard drive disk.

The detailed description is intended to provide a description of various exemplary embodiments of the present invention and is not intended to represent the only embodiments in which the invention may be practiced. The term "exemplary" used throughout this disclosure means "serving as an example, instance, or illustration," and should not necessarily be construed as preferred or advantageous over other embodiments. The detailed description includes specific details for the purpose of providing a thorough and complete disclosure that fully conveys the scope of the invention to those skilled in the art. However, the invention may be practiced without these specific details. In some instances, well-known structures and components may be shown in block diagram form, or omitted entirely, in order to avoid obscuring the various concepts presented throughout this disclosure.

Various aspects of the present invention may be described with reference to certain shapes and geometries. Any reference to a component having a particular shape or geometry, however, should not be construed as limited to the precise shape illustrated or described, but shall include deviations that result, for example, from manufacturing techniques and/or tolerances. By way of example, a component, or any part of a component, may be illustrated or described as rectangular, but in practice may have rounded or curved features due to manufacturing techniques and/or tolerances. Accordingly, the components illustrated in the drawings are schematic in nature and their shapes are not intended to illustrate the precise shape of the component, and therefore, not intended to limit the scope of the present invention.

In the following detailed description, various aspects of the present invention will be presented in the context of an STO for PMR hard disk drives. While these inventive aspects may be well suited for this application, those skilled in the art will realize that such aspects may be extended to other applications, such as memory, radio-frequency oscillators, and other suitable spin torque transfer applications. Accordingly, any reference to an STO for PMR hard drive disk is intended only to illustrate the various aspects of the present invention, with the understanding that such aspects may have a wide range of applications.

FIG. 1 is a conceptual view of an exemplary PMR hard drive disk. The PMR hard drive disk 100 is shown with a rotatable magnetic disk 102. The magnetic disk 102 may be rotated on a spindle 103 by a disk drive motor (not shown) located under the magnetic disk 102. A PMR head 104 may be used to read and write information by detecting and modifying the magnetic polarization of the recording layer on the disk's surface. The PMR head 104 is generally integrally formed with a carrier or slider (not shown). The function of the slider is to support the PMR head 104 and any electrical connections between the PMR head 104 and the rest of the PMR hard drive disk 100. The slider is aerodynamically designed to fly above the magnetic disk 102 by virtue of an air bearing created between the surface of the slider and the rotating magnetic disk 102. This surface of the slider is referred to as an air bearing surface (ABS). The slider is mounted to a positioner arm 106 which may be used to move the PMR head 104 on an arc across the rotating magnetic disk 102, thereby allowing the PMR head 104 to access the entire surface of the magnetic disk 102. The arm 106 may be moved using a voice coil actuator 108 or by some other suitable means.

Figure 2A:
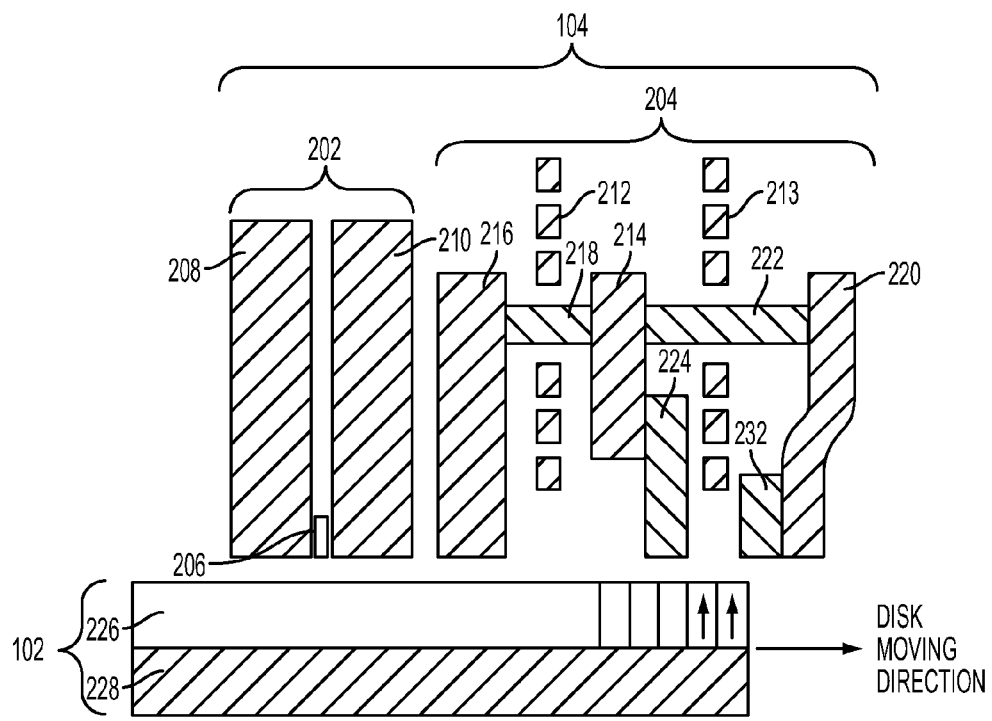
FIG. 2A is a cross-section view of an exemplary embodiment of a PMR head.

FIG. 2A is a cross-section view of an exemplary PMR head with an STO. The PMR head 104 is formed on a slider (not shown) and includes a PMR read head 202 and a PRM write head 204. The PMR read head 202 includes a read element 206 positioned between two shields 208 and 210. The PMR write head 204 includes a main pole 214 coupled to a pair of return poles. The first return pole 216 is coupled to the main pole 214 by a first yoke 218 and the second return pole 220 is coupled to the main pole 214 by a second yoke 222. The main pole 214 includes a write pole tip 224 with a surface that faces the surface of the magnetic disk 102. Two thin film coils 212, 213 are positioned around the main pole 214. The magnetic disk 102 is shown with a hard magnetic recording layer 226 and a soft magnetic under-layer 228, which together provide a flux path between the write pole tip 224 and the return poles 216 and 220.

In this example, the magnetic disk 102 is moved past the PMR head 104 along a circular track of the magnetic disk 102. When current is applied to the thin film coils 212, 213 a perpendicular magnetic field is created between the write pole tip 224 and the soft magnetic under-layer 228. The magnetic flux is collected by the soft magnetic under-layer 228 and returned to the return poles 216 and 220 to complete the magnetic circuit. The result is a magnetic charge with a perpendicular orientation on the segment of the magnetic recording layer 218 of the disk 102 immediately below the write pole tip 224.

Figure 2B:
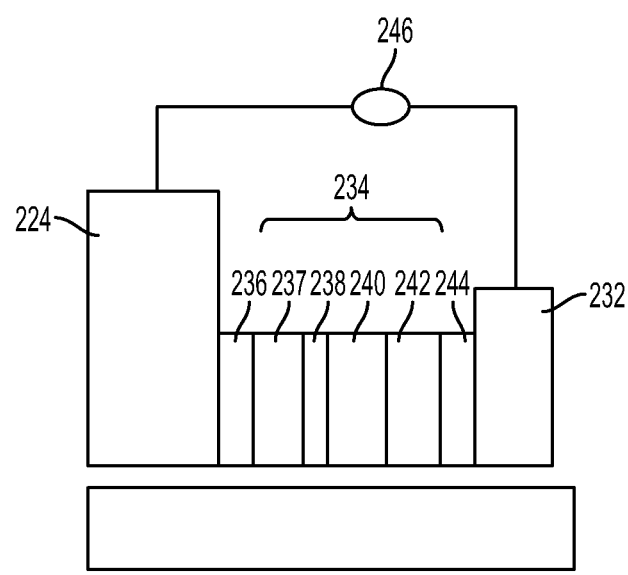
FIG. 2B is a cross-section view of a portion of the PMR head of FIG. 2A with an exemplary embodiment of an STO.

The PMR write head 204 is also shown with a trailing shield 232 separated from the write pole tip 224. The trailing shield 232 alters the angle of the write field as well as its gradient, and makes writing more efficient. An STO may be positioned between the write pole tip 224 and the trailing shield 232. An exemplary embodiment of an STO is illustrated in FIG. 2B. The STO 234 may include a field generating layer 240 and a polarization layer 237 separated by an interlayer 238. The interlayer 238 may be formed from copper or any other suitable material which provides electrical coupling and magnetic insulation between the field generating layer 240 and the polarization layer 237. A damping layer 242 may be exchanged coupled to the field generating layer 240. The STO 234 may have other layers that have been omitted from this description for the purpose of clarity. A spacer 236 may also be located between the polarization layer 237 and the write pole tip 224, and another spacer 244 may be located between the damping layer 242 and the trailing shield 232. These spacers 236, 244 may be formed from ruthenium (Ru), tantalum (Ta), or any other suitable material which provide electrical coupling and magnetic insulation and which depolarizes the current passing between. A current source 246 may be connected across the STO 234 through the write pole tip 224 and the trailing shield 232. Alternatively, the current source 246 may be connected across the STO 234 by electrodes attached to opposite ends of the STO 234.

In the exemplary embodiment shown, current is injected into the STO 234 through the write pole tip 224 and the trailing shield 232. The polarization layer 237 generates a spin-polarized current. The spin polarized current is used to excite magnetic oscillations in the field generating layer 240 and thereby generate a microwave field useful for MAMR applications.

In one exemplary embodiment, the STO 234 may have a cobalt field generating layer 240 exchanged coupled to a doped nickel-iron damping layer 242. In other exemplary embodiments, the STO 234 could have a field generating layer 240 made from a Heusler alloy to achieve high spin polarization or a cobolt-iron (CoFe) alloy to achieve high saturation magnetization to keep the magnetization in plane despite high applied perpendicular fields (deep gap field) and high microwave fields in the media. The damping layer 242 may be a ferromagnetic metal doped with rare earth element(s) such as gadolinium (Gd), terbium, (Tb), holmium (Ho), and/or any other suitable rare earth elements. Alternatively, the damping layer 242 may be a ferromagnetic metal doped with other damping enhancing elements such as silver (Ag), molybdenum (Mo), tungsten (W), platinum (Pt), palladium (Pd), gold (Au), chromium (Cr), or any other suitable material. By way of example, the damping layer 242 may be a nickel-iron alloy doped with gallium (Ga), silver (Ag), molybdenum (Mo), tungsten (W), and/or any other suitable material. Those skilled in the art will readily appreciate that the field generation layer 240 and the damping layer 242 may be manufactured from a selection of any suitable materials and the specific compositions described above for these layers are provided merely as an example and are not intended to limit the scope of the invention. Those skilled in the art will also be well suited to determine the appropriate materials for the field generating layer 240 and the damping layer 242 depending on the particular application and the overall design constraints imposed on the hard disk drive system.

A separate damping layer 242 provides increased damping to the field generating layer 240 of the STO 234 without degrading the saturation magnetization or the spin polarization of the field generating layer 240. At the same time, the damping layer 242 can be used to tune the frequency of the write head so that it matches the frequency requirement of the media. It also improves the stability and coherence of the magnetization of the field generating layer 240 and provides faster settling time for the magnetization when the write field is switched. This facilitates writing to the magnetic disk at high data rates.

The various aspects of this disclosure are provided to enable one of ordinary skill in the art to practice the present invention. Various modifications to exemplary embodiments presented throughout this disclosure will be readily apparent to those skilled in the art, and the concepts disclosed herein may be extended to other devices. Thus, the claims are not intended to be limited to the various aspects of this disclosure, but are to be accorded the full scope consistent with the language of the claims. All structural and functional equivalents to the various components of the exemplary embodiments described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A microwave assisted magnetic recording (MAMR) write head, comprising:
    a write pole tip;
    a trailing shield;
    a spin torque oscillator between the write pole tip and the trailing shield, the spin torque oscillator having a first spacer adjacent to the write pole tip, a polarization layer, a field generating layer, a damping layer exchanged coupled to the field generating layer, and a second spacer located between the damping layer and the trailing shield, wherein the damping layer is configured to tune a frequency of the spin torque oscillator to match a frequency requirement of a recording media; and
    a current source connected across the spin torque oscillator, the current source configured to inject a current into the spin torque oscillator;
    wherein the polarization layer is configured to generate a spin-polarized current that excites magnetic oscillations in the field generating layer to generate a microwave field, and
    wherein the first spacer and the second spacer are configured to depolarize a current passing through the spin torque oscillator.

2. The MAMR write head of claim 1 wherein the spin torque oscillator further comprises an interlayer between the polarization layer and the field generating layer.

3. The MAMR write head of claim 1 wherein the field generating layer comprises a Heusler alloy.

4. The MAMR write head of claim 1 wherein the field generating layer comprises at least one of cobalt and iron.

5. The MAMR write head of claim 1 wherein the damping layer comprises a ferromagnetic metal doped with a rare earth element.

6. The MAMR write head of claim 5 wherein the rare earth element comprises a material selected from the group consisting of gadolinium (Gd), terbium (Tb), and holmium (Ho).

7. The MAMR write head of claim 1 wherein the damping layer comprises a ferromagnetic metal doped with a material selected from the group consisting of silver (Ag), molybdenum (Mo), tungsten (W), platinum (Pt), palladium (Pd), gold (Au), and chromium (Cr).

8. The MAMR write head of claim 1 wherein the damping layer comprises a nickel-iron alloy doped with a material selected from the group consisting of gallium (Ga), silver (Ag), molybdenum (Mo), and tungsten (W).

9. A microwave assisted magnetic recording (MAMR) write head, comprising:
    a write pole tip;
    a trailing shield;
    a spin torque oscillator between the write pole tip and the trailing shield, the spin torque oscillator having a first spacer adjacent to the write pole tip, a polarization layer, a field generating layer, a second layer exchanged coupled to the field generating layer, and a second spacer located between the second layer and the trailing shield, wherein the second layer is configured to provide magnetic damping greater than the magnetic damping in the field generating layer, and further wherein the second layer is configured to tune a frequency of the spin torque oscillator to match a frequency requirement of a recording media; and
    a current source connected across the spin torque oscillator, the current source configured to inject a current into the spin torque oscillator;
    wherein the polarization layer is configured to generate a spin-polarized current that excites magnetic oscillations in the field generating layer to generate a microwave fields, and
    wherein the first spacer and the second spacer are configured to depolarize a current passing through the spin torque oscillator.

10. The MAMR write head of claim 9 wherein the spin torque oscillator further comprises an interlayer between the polarization layer and the field generating layer.

11. The MAMR write head of claim 9 wherein the field generating layer comprises a Heusler alloy.

12. The MAMR write head of claim 9 wherein the field generating layer comprises at least one of cobalt and iron.

13. The MAMR write head of claim 9 wherein the second layer comprises a ferromagnetic metal doped with a rare earth element.

14. The MAMR write head of claim 13 wherein the rare earth element comprises a material selected from the group consisting of gadolinium (Gd), terbium (Tb), and holmium (Ho).

15. The MAMR write head of claim 9 wherein the second layer comprises a ferromagnetic metal doped with a material selected from the group consisting of silver Ag), molybdenum (Mo), tungsten (W), platinum (Pt), palladium (Pd), gold (Au), and chromium (Cr).

16. The MAMR write head of claim 9 wherein the second layer comprises a nickel-iron alloy doped with a material selected from the group consisting of gallium (Ga), silver (Ag), molybdenum (Mo), and tungsten (W).

17. A microwave assisted magnetic recording (MAMR) write head, comprising:
   a write pole tip;
   a trailing shield;
   a spin torque oscillator between the write pole tip and the trailing shield, the spin torque oscillator having a first spacer adjacent to the write pole tip, a polarization layer, a field generating layer, a second layer exchanged coupled to the field generating layer, and a second spacer located between the second layer and the trailing shield, wherein the second layer is configured to increase damping to the field generating layer and further wherein the second layer is configured to tune a frequency of the spin torque oscillator to match a frequency requirement of a recording media; and
   a current source connected across the spin torque oscillator, the current source configured to inject a current into the spin torque oscillator;
      wherein the polarization layer is configured to generate a spin-polarized current that excites magnetic oscillations in the field generating layer to generate a microwave field, and
      wherein the first spacer and the second spacer are configured to depolarize a current passing through the spin torque oscillator.

18. The MAMR write head of claim 17 wherein the spin torque oscillator further comprises an interlayer between the polarization layer and the field generating layer.

19. The MAMR write head of claim 17 wherein the field generating layer comprises a Heusler alloy.

20. The MAMR write head of claim 17 wherein the field generating layer comprises at least one of cobalt and iron.

21. The MAMR write head of claim 17 wherein the second layer comprises a ferromagnetic metal doped with a rare earth element.

22. The MAMR write head of claim 21 wherein the rare earth element comprises a material selected from the group consisting of gadolinium (Gd), terbium (Tb), and holmium (Ho).

23. The MAMR write head of claim 17 wherein the second layer comprises a ferromagnetic metal doped with a material selected from the group consisting of silver Ag), molybdenum (Mo), tungsten (W), platinum (Pt), palladium (Pd), gold (Au), and chromium (Cr).

24. The MAMR write head of claim 17 wherein the second layer comprises a nickel-iron alloy doped with a material selected from the group consisting of gallium (Ga), silver (Ag), molybdenum (Mo), and tungsten (W).

25. A magnetic hard disk drive, comprising:
   a rotatable magnetic recording disk and
   a microwave assisted magnetic recording (MAMR) write head arranged within the hard disk drive to interface with the magnetic recording disk, wherein the MAMR write head comprises a write pole tip, a trailing shield, a spin torque oscillator between the write pole tip and the trailing shield, the spin torque oscillator having a first spacer adjacent to the write pole tip, a polarization layer, a field generating layer, a damping layer exchanged coupled to the field generating layer, and a second spacer located between the damping layer and the trailing shield, and a current source connected across the spin torque oscillator, the current source configured to inject a current into the spin torque oscillator, wherein the damping layer is configured to tune a frequency of the spin torque oscillator relative to match a frequency requirement of the magnetic recording disk, wherein the polarization layer is configured to generate a spin-polarized current that excites magnetic oscillations in the field generating layer to generate a microwave field, and wherein the first spacer and the second spacer are configured to depolarize a current passing through the spin torque oscillator.

26. A spin torque oscillator for a microwave assisted magnetic recording (MAMR) write head, comprising:
   a first spacer adjacent to a write pole tip;
   a polarization layer;
   a field generating layer, wherein the polarization layer is configured to generate a spin-polarized current that excites magnetic oscillations in the field generating layer to generate a microwave field;
   a damping layer exchanged coupled to the field generating layer, wherein the damping layer is configured to tune a frequency of the spin torque oscillator to match a frequency requirement of a recording media; and
   a second spacer located between the damping layer and a trailing shield,
      wherein the first spacer and the second spacer are configured to depolarize a current passing through the spin torque oscillator.

* * * * *